United States Patent
Einberg et al.

(10) Patent No.: US 11,468,720 B2
(45) Date of Patent: *Oct. 11, 2022

(54) WEARABLE MISPLACEMENT

(71) Applicant: ASSA ABLOY AB, Stockholm (SE)

(72) Inventors: Fredrik Carl Stefan Einberg, Huddinge (SE); Daniel Berg, Sundbyberg (SE); Philip Hoyer, Richmond (GB)

(73) Assignee: ASSA ABLOY AB, Stockholm (SE)

( * ) Notice: Subject to any disclaimer, the term of this patent is extended or adjusted under 35 U.S.C. 154(b) by 137 days.

This patent is subject to a terminal disclaimer.

(21) Appl. No.: 16/895,546

(22) Filed: Jun. 8, 2020

(65) Prior Publication Data

US 2020/0302719 A1    Sep. 24, 2020

Related U.S. Application Data

(63) Continuation of application No. 15/569,208, filed as application No. PCT/EP2016/059756 on May 2, 2016, now Pat. No. 10,679,440.

(Continued)

(51) Int. Cl.
*H04L 9/40*    (2022.01)
*G07C 9/00*    (2020.01)
(Continued)

(52) U.S. Cl.
CPC ......... *G07C 9/00309* (2013.01); *G06F 1/163* (2013.01); *G07C 9/00174* (2013.01);
(Continued)

(58) Field of Classification Search
CPC ............ G07C 9/00309; G07C 9/00174; G07C 9/00571; G07C 9/257; G07C 9/28;
(Continued)

(56) References Cited

U.S. PATENT DOCUMENTS

| | | | |
|---|---|---|---|
| 6,374,356 | B1 | 4/2002 | Daigneault et al. |
| 6,719,200 | B1 | 4/2004 | Wiebe |

(Continued)

FOREIGN PATENT DOCUMENTS

| | | |
|---|---|---|
| CN | 101272251 | 9/2008 |
| EP | 1710974 | 10/2005 |

(Continued)

OTHER PUBLICATIONS

Notice of Opposition for European Patent Application No. 16720406.4, dated Mar. 30, 2021, 27 pages.

(Continued)

*Primary Examiner* — Meng Li
(74) *Attorney, Agent, or Firm* — Sheridan Ross P.C.

(57) ABSTRACT

An access control system is described in which a primary credential device has a master key and a secondary credential device has a key derived from the master key. Both the master key and the derivative key are required to gain access to the resource protected by the access control system. If the secondary credential device is lost, misplaced, or stolen, it cannot be used to gain illicit access to the protected resource, and it can be easily replaced by providing a different secondary credential device with another key derived from the master key.

20 Claims, 8 Drawing Sheets

Related U.S. Application Data

(60) Provisional application No. 62/198,240, filed on Jul. 29, 2015, provisional application No. 62/197,945, filed on Jul. 28, 2015, provisional application No. 62/197,985, filed on Jul. 28, 2015, provisional application No. 62/167,172, filed on May 27, 2015, provisional application No. 62/167,136, filed on May 27, 2015, provisional application No. 62/164,099, filed on May 20, 2015, provisional application No. 62/162,273, filed on May 15, 2015, provisional application No. 62/161,640, filed on May 14, 2015, provisional application No. 62/156,030, filed on May 1, 2015, provisional application No. 62/156,035, filed on May 1, 2015.

(51) Int. Cl.
| | | |
|---|---|---|
| *H04W 12/08* | (2021.01) | |
| *H04L 9/32* | (2006.01) | |
| *H04W 12/06* | (2021.01) | |
| *G07C 9/28* | (2020.01) | |
| *G07C 9/25* | (2020.01) | |
| *H04W 12/33* | (2021.01) | |
| *G08B 7/06* | (2006.01) | |
| *G08B 25/01* | (2006.01) | |
| *H04W 12/04* | (2021.01) | |
| *G06F 1/16* | (2006.01) | |
| *H04B 1/3827* | (2015.01) | |
| *G06F 21/34* | (2013.01) | |
| *H04W 4/80* | (2018.01) | |
| *H04W 12/63* | (2021.01) | |
| *H04W 12/68* | (2021.01) | |
| *G06V 40/10* | (2022.01) | |
| *H04W 12/64* | (2021.01) | |
| *H04W 88/02* | (2009.01) | |

(52) U.S. Cl.
CPC ......... *G07C 9/00571* (2013.01); *G07C 9/257* (2020.01); *G07C 9/28* (2020.01); *G08B 7/066* (2013.01); *G08B 25/016* (2013.01); *H04B 1/385* (2013.01); *H04L 9/3226* (2013.01); *H04L 63/0428* (2013.01); *H04L 63/062* (2013.01); *H04L 63/083* (2013.01); *H04L 63/0853* (2013.01); *H04L 63/0861* (2013.01); *H04L 63/0876* (2013.01); *H04L 63/108* (2013.01); *H04W 12/04* (2013.01); *H04W 12/06* (2013.01); *H04W 12/08* (2013.01); *H04W 12/33* (2021.01); *G06F 21/34* (2013.01); *G06V 40/10* (2022.01); *G07C 9/00563* (2013.01); *G07C 2009/00769* (2013.01); *H04L 2463/121* (2013.01); *H04W 4/80* (2018.02); *H04W 12/63* (2021.01); *H04W 12/64* (2021.01); *H04W 12/68* (2021.01); *H04W 88/02* (2013.01)

(58) Field of Classification Search
CPC ...... G07C 9/00563; G07C 2009/00769; G06F 1/163; G06F 21/34; G06F 2221/2141; G06F 21/64; G06F 21/604; G08B 7/066; G08B 25/016; H04B 1/385; H04L 9/3226; H04L 63/0428; H04L 63/062; H04L 63/083; H04L 63/0853; H04L 63/0861; H04L 63/0876; H04L 63/108; H04L 2463/121; H04W 12/04; H04W 12/06; H04W 12/08; H04W 4/80; H04W 12/63; H04W 12/68; H04W 88/02; H04W 12/64; H04W 12/065; H04W 12/33; H04W 12/40; G06V 40/10

See application file for complete search history.

(56) References Cited

U.S. PATENT DOCUMENTS

| | | | |
|---|---|---|---|
| 6,766,450 | B2 | 7/2004 | Micali |
| 7,706,778 | B2 | 4/2010 | Lowe |
| 8,074,271 | B2 | 12/2011 | Davis et al. |
| 8,184,983 | B1 | 5/2012 | Ho et al. |
| 8,595,806 | B1 * | 11/2013 | Gabrielson ............ H04L 63/18 |
| | | | 726/7 |
| 9,269,208 | B2 | 2/2016 | Burke |
| 9,280,860 | B2 | 3/2016 | Malhotra et al. |
| 9,344,436 | B1 | 5/2016 | Sheng et al. |
| 9,672,727 | B1 | 6/2017 | Alexander et al. |
| 9,779,568 | B2 | 10/2017 | Shibutani et al. |
| 9,942,222 | B1 | 4/2018 | Fenton et al. |
| 10,431,026 | B2 | 10/2019 | Berg et al. |
| 10,482,698 | B2 | 11/2019 | Caterino et al. |
| 10,490,005 | B2 | 11/2019 | Caterino et al. |
| 10,679,440 | B2 | 6/2020 | Einberg et al. |
| 2002/0178385 | A1 | 11/2002 | Dent et al. |
| 2003/0141977 | A1 | 7/2003 | Brown et al. |
| 2003/0144952 | A1 | 7/2003 | Brown et al. |
| 2005/0151640 | A1 | 7/2005 | Hastings |
| 2007/0024417 | A1 | 2/2007 | Gerstenkorn |
| 2007/0204349 | A1 | 8/2007 | Sparks et al. |
| 2008/0068183 | A1 | 3/2008 | Diamant |
| 2008/0089521 | A1 | 4/2008 | Le Saint et al. |
| 2008/0284564 | A1 | 11/2008 | Leitch |
| 2010/0122350 | A1 | 5/2010 | Munje et al. |
| 2010/0274100 | A1 | 10/2010 | Behar et al. |
| 2010/0304716 | A1 | 12/2010 | Hoeksel et al. |
| 2011/0214158 | A1 | 9/2011 | Pasquero et al. |
| 2012/0112901 | A1 | 5/2012 | Chasko |
| 2012/0126940 | A1 | 5/2012 | Coggill |
| 2012/0167232 | A1 | 6/2012 | Moosavi et al. |
| 2012/0170751 | A1 * | 7/2012 | Wurm ................... H04L 9/0897 |
| | | | 380/278 |
| 2012/0311675 | A1 | 12/2012 | Ham et al. |
| 2013/0015947 | A1 | 1/2013 | Best |
| 2013/0024374 | A1 | 1/2013 | Weiss |
| 2013/0044055 | A1 | 2/2013 | Karmarkar et al. |
| 2013/0060577 | A1 | 3/2013 | Debusk et al. |
| 2013/0086375 | A1 | 4/2013 | Lyne et al. |
| 2013/0091561 | A1 | 4/2013 | Brusso et al. |
| 2013/0095802 | A1 | 4/2013 | Wang |
| 2013/0124855 | A1 | 5/2013 | Varadarajan et al. |
| 2013/0151400 | A1 * | 6/2013 | Makhotin .......... G06Q 20/3229 |
| | | | 705/39 |
| 2013/0212248 | A1 | 8/2013 | Neafsey et al. |
| 2013/0237190 | A1 * | 9/2013 | Smith ................. H04L 63/0492 |
| | | | 455/411 |
| 2013/0257613 | A1 | 10/2013 | Jarman et al. |
| 2013/0324081 | A1 | 12/2013 | Gargi et al. |
| 2014/0056220 | A1 | 2/2014 | Poitau et al. |
| 2014/0091903 | A1 | 4/2014 | Birkel et al. |
| 2014/0120905 | A1 | 5/2014 | Kim |
| 2014/0165165 | A1 | 6/2014 | Story, Jr. |
| 2014/0173690 | A1 | 6/2014 | Ekberg et al. |
| 2014/0197948 | A1 | 7/2014 | Mo et al. |
| 2014/0225713 | A1 | 8/2014 | McIntyre et al. |
| 2014/0282877 | A1 | 9/2014 | Mahaffey et al. |
| 2014/0282927 | A1 | 9/2014 | McLaughlin et al. |
| 2014/0341441 | A1 | 11/2014 | Slaby et al. |
| 2014/0359722 | A1 | 12/2014 | Shultz et al. |
| 2014/0373111 | A1 | 12/2014 | Moss et al. |
| 2015/0017979 | A1 | 1/2015 | Kang et al. |
| 2015/0028996 | A1 | 1/2015 | Agrafioti et al. |
| 2015/0067803 | A1 | 3/2015 | Alduaiji |
| 2015/0070134 | A1 | 3/2015 | Nagisetty et al. |
| 2015/0121465 | A1 | 4/2015 | Berns et al. |
| 2015/0140964 | A1 | 5/2015 | Horton |
| 2015/0161876 | A1 | 6/2015 | Castillo |
| 2015/0172897 | A1 | 6/2015 | Mariathasan et al. |

(56) References Cited

U.S. PATENT DOCUMENTS

| | | | |
|---|---|---|---|
| 2015/0208237 A1* | 7/2015 | Kuc | H04L 63/0853 726/4 |
| 2015/0309767 A1 | 10/2015 | Osoinach et al. | |
| 2016/0036965 A1 | 2/2016 | Kim | |
| 2016/0165450 A1 | 6/2016 | Hunt et al. | |
| 2016/0254907 A1* | 9/2016 | Messerman | H04N 21/2347 380/279 |
| 2016/0274556 A1 | 9/2016 | Murphy | |
| 2016/0283737 A1 | 9/2016 | Soman et al. | |
| 2016/0294817 A1 | 10/2016 | Tan et al. | |
| 2016/0359864 A1 | 12/2016 | Dhaliwal et al. | |
| 2017/0208464 A1 | 7/2017 | Guertler et al. | |
| 2017/0220791 A1 | 8/2017 | Shibutani et al. | |
| 2018/0115897 A1 | 4/2018 | Einberg et al. | |
| 2018/0302416 A1 | 10/2018 | Einberg et al. | |

FOREIGN PATENT DOCUMENTS

| | | | |
|---|---|---|---|
| EP | 1760671 | 3/2007 | |
| EP | 1895445 | 3/2008 | |
| EP | 1926038 | 5/2008 | |
| EP | 1926038 A1 * | 5/2008 | G06F 21/34 |
| EP | 2434461 | 3/2012 | |
| EP | 2469816 | 6/2012 | |
| EP | 2493232 | 8/2012 | |
| EP | 2620919 | 7/2013 | |
| EP | 2809046 | 12/2014 | |
| EP | 2938112 | 10/2015 | |
| GB | 2402840 | 12/2004 | |
| WO | WO 2004/025545 | 3/2004 | |
| WO | WO 2005/024549 | 3/2005 | |
| WO | WO 2007/121414 | 10/2007 | |
| WO | WO 2009/089208 | 7/2009 | |
| WO | WO 2009/127984 | 10/2009 | |
| WO | WO 2009/143415 | 11/2009 | |
| WO | WO 2012/113080 | 8/2012 | |
| WO | WO 2013/118454 | 8/2013 | |
| WO | WO 2014/098755 | 6/2014 | |
| WO | WO 2014/172325 | 10/2014 | |
| WO | WO 2014/191537 | 12/2014 | |
| WO | WO 2015/048349 | 4/2015 | |
| WO | WO 2016/167895 | 10/2016 | |
| WO | WO 2016/177666 | 11/2016 | |
| WO | WO 2016/177668 | 11/2016 | |
| WO | WO 2016/177669 | 11/2016 | |
| WO | WO 2016/177671 | 11/2016 | |
| WO | WO 2016/177672 | 11/2016 | |
| WO | WO 2016/177673 | 11/2016 | |
| WO | WO 2016/178081 | 11/2016 | |
| WO | WO 2016/178082 | 11/2016 | |
| WO | WO 2016/178085 | 11/2016 | |

OTHER PUBLICATIONS

Notice of Allowance for U.S. Appl. No. 15/569,355, dated Mar. 26, 2021 11 pages.
Ballendat et al. "Proxemic Interaction: Designing fora Proximity and Orientation-Aware Environment," ACM, ITS 2010: Context 2, Nov. 7-10, 2010, Saarbrucken, Germany, pp. 121-130.
Diez et al. "Toward Self-Authenticable Wearable Devices," IEEE Wireless Communications, Feb. 2015, vol. 22, No. 1, pp. 36-43.
Sorber et al. "An Amulet for Trustworthy Wearable mHealth," ACM, HotMobile 2012, Feb. 28-29, 2012, San Diego, California, USA, 6 pages.
Vu et al. "Personal Touch-Identification Tokens," IEEE, 2013, vol. 12, No. 2, pp. 10-13.
Official Action for U.S. Appl. No. 15/569,355, dated Aug. 5, 2020 25 pages.
Notice of Allowance for U.S. Appl. No. 15/569,196, dated Jul. 23, 2020 16 pages.
International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/IB2016/000654, dated Aug. 8, 2016 13 pages.
Second Written Opinion for International (PCT) Patent Application No. PCT/IB2016/000654, dated Jun. 7, 2017 8 pages.
International Preliminary Report on Patentability for International (PCT) Patent Application No. PCT/IB2016/000654, dated Sep. 4, 2017 22 pages.
International Search Report and Written Opinion for International (PCT) Patent Application No. PCT/EP2016/059748, dated Jun. 24, 2016 13 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
International Search Report and Written Opinion for International (PCT) Patent Application No. PCT/EP2016/059750, dated Aug. 2, 2016 12 pages.
International Preliminary Report on Patentability for International (PCT) Patent Application No. PCT/EP2016/059750, dated Nov. 16, 2017 8 pages.
International Search Report and Written Opinion for International (PCT) Patent Application No. PCT/IB2016/000653, dated Sep. 2, 2016 12 pages.
Second Written Opinion for International (PCT) Patent Application No. PCT/IB2016/000653, dated Apr. 28, 2017 6 pages.
International Preliminary Report on Patentability for International (PCT) Patent Application No. PCT/IB2016/000653, dated Jul. 27, 2017 7 pages.
International Search Report and Written Opinion for International (PCT) Patent Application No. PCT/EP2016/059753, dated Jun. 3, 2016 11 pages.
Second Written Opinion for International (PCT) Patent Application No. PCT/EP2016/059753, dated Mar. 31, 2017 6 pages.
International Preliminary Report on Patentability for International (PCT) Patent Application No. PCT/EP2016/059753, dated Jul. 3, 2017 18 pages.
International Search Report and Written Opinion for International (PCT) Patent Application No. PCT/EP2016/059752, dated Jul. 26, 2016 12 pages.
Second Written Opinion for International (PCT) Patent Application No. PCT/EP2016/059752, dated Mar. 29, 2017 6 pages.
International Preliminary Report on Patentability for International (PCT) Patent Application No. PCT/EP2016/059752, dated Jun. 28, 2017 17 pages.
International Search Report and Written Opinion for International (PCT) Patent Application No. PCT/EP2016/059754, dated Jun. 8, 2016 12 pages.
Second Written Opinion for International (PCT) Patent Application No. PCT/EP2016/059754, dated Mar. 21, 2017 5 pages.
International Preliminary Report on Patentability for International (PCT) Patent Application No. PCT/EP2016/059754, dated Jun. 19, 2017 19 pages.
International Search Report and Written Opinion for International (PCT) Patent Application No. PCT/EP2016/059756, dated Jun. 27, 2016 11 pages.
Second Written Opinion for International (PCT) Patent Application No. PCT/EP2016/059756, dated Mar. 31, 2017 6 pages.
International Preliminary Report on Patentability for International (PCT) Patent Application No. PCT/EP2016/059756, dated Jul. 3, 2017 17 pages.
International Search Report and Written Opinion for International (PCT) Patent Application No. PCT/IB2016/000669, dated Aug. 1, 2016 12 pages.
Second Written Opinion for International (PCT) Patent Application No. PCT/IB2016/000669, dated Apr. 6, 2017 6 pages.

(56) References Cited

OTHER PUBLICATIONS

Official Action for U.S. Appl. No. 15/569,218, dated Nov. 16, 2018 14 pages.
Notice of Allowance for U.S. Appl. No. 15/569,218, dated May 15, 2019 9 pages.
Official Action for U.S. Appl. No. 15/569,355, dated Aug. 20, 2019 25 pages.
Notice of Allowance for U.S. Appl. No. 15/568,934, dated Jul. 15, 2019 21 pages.
Official Action for U.S. Appl. No. 15/569,196, dated Mar. 22, 2019 17 pages.
Official Action for U.S. Appl. No. 15/569,196, dated Jun. 11, 2019 22 pages.
Official Action for U.S. Appl. No. 15/569,208, dated Sep. 12, 2019 12 pages.
Notice of Allowance for U.S. Appl. No. 15/569,208, dated Feb. 3, 2020 9 pages.
Official Action for U.S. Appl. No. 15/569,105, dated Jun. 25, 2018 19 pages.
Official Action for U.S. Appl. No. 15/569,105, dated Nov. 23, 2018 24 pages.
Advisory Action for U.S. Appl. No. 15/569,105, dated Mar. 11, 2019 5 pages.
Notice of Allowance for U.S. Appl. No. 15/569,105, dated Jul. 16, 2019 13 pages.
Official Action with English Translation for China Patent Application No. 201680032259.1, dated Mar. 12, 2020, 22 pages.
Official Action for U.S. Appl. No. 15/569,196, dated Jan. 23, 2020 23 pages.

\* cited by examiner

WEARABLE MISPLACEMENT

CROSS REFERENCE TO RELATED APPLICATIONS

The present application is a continuation of U.S. patent application Ser. No. 15/569,208, filed Oct. 25, 2017, now U.S. Pat. No. 10,679,440, issuing Jun. 9, 2020, which claims the benefit of PCT Application No. PCT/EP2016/059756, having an international filing date of May 2, 2016, which claims the benefits of and priority, under 35 U.S.C. § 119(e), to U.S. Provisional Application Ser. Nos. 62/156,035, filed on May 1, 2015, entitled "Authentication Channel Flow through Wearable"; 62/156,030, filed on May 1, 2015, entitled "Using Multiple Mobile Devices to Determine Position, Location, or Inside/Outside Door"; 62/161,640, filed on May 14, 2015, entitled "Using Wearable to Determine Ingress or Egress"; 62/162,273, filed on May 15, 2015, entitled "Continuous Authentication"; 62/164,099, filed on May 20, 2015, entitled "Using a Secondary Mobile Device to Identify a Trusted Environment"; 62/167,172, filed on May 27, 2015, entitled "Method and Apparatus for Making a Decision on a Card"; 62/167,136, filed on May 27, 2015, entitled "Split Provisioning of Personal Wearable and Enterprise Phone"; 62/197,945, filed on Jul. 28, 2015, entitled "Wearable Discovery for Authentication"; 62/197,985, filed on Jul. 28, 2015, entitled "Wearable Misplacement"; and 62/198,240, filed on Jul. 29, 2015, entitled "Invisible Indication of Duress via Wearable." The entire disclosures of the applications listed above are hereby incorporated by reference, in their entirety, for all that they teach and for all purposes.

FIELD

The present disclosure is generally directed to access control systems and more specifically to devices that are configured to provide access information to access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

One example of a portable device includes the radio frequency identification (RFID) device, such as a contactless smart card, key fob, or the like, to store credential information that can be used to gain access to an asset. When presented to a reader/interrogator, the smart card transmits the stored credential information for verification by the reader/interrogator. The reader/interrogator processes the credential information and determines if the smart card being presented is a valid smart card. If the reader/interrogator determines that credential information associated with the smart card is valid, then the reader/interrogator initiates any number of actions including allowing the holder of the smart card access to an asset protected thereby.

Another example of a portable device can include a wireless mobile device, such as a communication device, mobile phone, smartphone, etc. In this case, credential information may be stored in a memory associated with the mobile device and communicated to a reading device using at least one wireless communication protocol available to the mobile phone.

As access control technology continually progresses, devices and communication protocols evolve to offer more security, portability, and interoperability. However, the benefits of this evolution may be thwarted by increasing instances of identity theft, stolen credentials, and/or other access control device theft.

SUMMARY

It is with respect to the above issues and other problems that the embodiments presented herein were contemplated.

Access control systems are well-suited for gathering useful information. For example, an access control system may be configured to count the number of times it grants access to the protected resource in a given period of time (hour, day, week, etc.), which information can then be used to identify needed access point maintenance intervals, or to schedule or allocate access-point resources (e.g. security guards, receptionists, and so forth). While some access control systems may be capable only of tracking generic information, others may be capable of tracking user-specific information, such as the time(s) at which each user presents credentials to the access control system reader. Such information can be used, for example, to verify an individual's claimed hours worked.

The proliferation of wearable mobile devices presents an opportunity to enhance access control system functionality. Such wearable mobile devices may be used in place of or in conjunction with more traditional mobile devices to gather and send information to an access control system, thus increasing the ability of the access control system to gather useful information.

Inherent in the use of smartcards, key fobs, mobile devices, or other loose objects as credentials is the possibility that the owner of the credential may be separated from the credential itself—whether deliberately (e.g. by theft) or accidentally (e.g. by misplacing or losing the credential). If someone other than the owner of the credential obtains possession of the credential, then the security of the access control system associated with the credential may be compromised. While some access control systems have mechanisms in place to deal with lost or stolen credentials, such as blacklisting the credential or revoking the credential's digital keys, such mechanisms generally take time to implement and often require that the owner of the credential both recognize that the credential has been lost or stolen and report that information to the access control system operator. Until these actions are taken, an illicit possessor of the credential may use the credential to gain access to the resource protected by the access control system, thus rendering the access control system ineffective.

The trend toward increased use of multiple mobile devices may be exploited to enhance access control system security and reduce the likelihood that anyone other than a credential's owner may use the credential to gain access to a resource protected by an access control system. In particular, an access control system may be configured to require the presentation of two credentials—a primary credential device and a secondary credential device—by a person seeking access to a given protected resource. One or both of the primary and secondary credential devices may be a mobile device, including a wearable mobile device.

While the use of primary and secondary credential devices allows for enhanced security, the possibility remains that one or both of the credentials may be lost, misplaced, stolen, or otherwise rendered unavailable for use as a credential. The present disclosure addresses aspects of that problem.

As used herein, an access control system is a system comprising a reader configured to control access to a protected resource at a given access point, such as a door or gate, and further comprising one or more credentials (e.g., an RFID tag, a mobile device, etc.) configured to communicate with the reader. A mobile device may be a smartphone, a tablet, or any other device comprising a processor, a data storage capability (e.g., computer memory), and a wireless communication capability. The terms identification code, electronic key, and mobile key are used interchangeably herein. A user is an individual in possession of a mobile device that has an authorized identification code and that is configured to wirelessly communicate with the reader of an access control system. A reader or reading device or interrogator is a device having a location (which may or may not be fixed) near an access point to a protected resource, and that is configured to grant access to the protected resource, for example, upon receipt of authorized credentials from a mobile device. A reader may comprise a contact-based or contactless communication interface (also referred to herein as a wireless communication interface, which may include one or both of a wireless communication receiver and a wireless communication transmitter, or a wireless communication transceiver), a memory for storing at least instructions, and a processor for carrying out instructions stored in memory. Alternatively or additionally, the instructions may be stored as firmware.

A wearable mobile device, also referred to simply as a wearable device, can include any physical electronic device having a processor, a memory, and a communications module that is configured to be worn by, or otherwise attached to, a user. A wearable mobile device is a type of mobile device, as the term mobile device is used herein. In some cases, the wearable device may be worn as an implant introduced intradermally (e.g., within the skin, etc.) and/or subdermally (e.g., under the skin, etc.) in a user. Additionally or alternatively, a wearable device may be adhered or otherwise placed into contact with the dermis of a user (e.g., supradermally or outside of the skin of a user, etc.). In some embodiments, a wearable device may be worn as an article of clothing or other accessory. Examples of wearable devices can include, but are in no way limited to, activity monitors, heart rate monitors, watches, rings, belts, bracelets, jewelry, clothing, buttons, necklaces, shoes, hats, pins, accessories, scarves, combinations and/or parts thereof, and/or any other wearable item.

By way of example, visitors to a secure facility, or location, may be issued a wearable device for authentication while visiting. For example, the wearable device may be attached to a user's clothing, body, or other item that is in proximity to the user. This attachment may include clasping, pinning, connecting, or otherwise fastening the wearable device to be worn by the user.

Any number of communications protocols may be employed by the wearable device and/or the mobile device. Examples of communications protocols can include, but are in no way limited to, the protocol or protocols associated with near field communication (NFC), radio frequency identification (RFID) (e.g., operating at 125 kHz, 13.56 kHz, etc.), Bluetooth® wireless communication, Bluetooth® Low Energy (BLE), Personal Area Network (PAN), Body Area Network (BAN), cellular communications, Wi-Fi communications, and/or other wireless communications.

For instance, a user carrying a mobile device and wearing a wearable device while walking may impart a similar repetitive motion, force, or movement upon both the wearable device and the mobile device. Continuing this example, a user walking may provide a substantially similar force while stepping that is imparted to the wearable device and the mobile device. This force may occur with every step taken by the user (e.g., where a peak force occurs with every step that is taken at some point in time measured over a period of time, etc.). In other words, both the mobile device and the wearable device may experience a similar periodicity of maximum and minimum forces exerted on their respective sensors (e.g., gyroscopic sensors, accelerometers, etc.). Additionally or alternatively, when a wearable device is separated from the mobile device, or vice versa, the motion results from the comparison may be determined to be different. For example, a user may leave a mobile device on a desk while walking with the wearable device in an access controlled environment.

Similarly, other information from one or more components of the wearable device and mobile device may be gathered and used by an access control system. This information may include, but is in no way limited to, temperature data, barometric pressure data, biometric data (e.g., heart rate, breathing rate, etc.), altimeter and/or altitude data, audible data (e.g., detecting similar sounds in an area around each device and comparing the detected sounds and/or sound profiles to one another determine whether continuous authentication is allowed, where matching audible data allows authentication and where nonmatching audible data disables authentication, etc.), light data (e.g., detecting similar light radiation in an area around each device and comparing the light detected at each device to determine whether continuous authentication is allowed, etc.), magnetic radiation data, other energy data, combinations thereof, and/or the like.

As provided herein, the wearable device may be configured to operate in conjunction with one or more mobile devices. In some embodiments, the mobile devices may be provided by a manufacturer different from the wearable device and the two devices may utilize the same or different operating systems.

The wearable device may include its own power source or use power provided from another source. In some embodiments, the wearable device may include electronics that can be powered by a mobile device and/or a reading device. One example of such electronics may be a wearable device having RFID components, (e.g., a capacitor, antenna, etc.). In this example, when the wearable device is presented within an RFID field provided by the mobile device and/or the reading device, the mobile device and/or the reading device provides energy via the RFID field that can be stored in the capacitor of the wearable device.

The terms "memory," "computer memory," and "computer-readable medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credentials" or "credential information" refer to any data, set of data, encryption scheme, key, and/or transmission protocol used by a particular device (e.g., a "credential device," a "mobile device", or a "wearable device") to authenticate and/or to verify its authenticity with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

Figure 1:
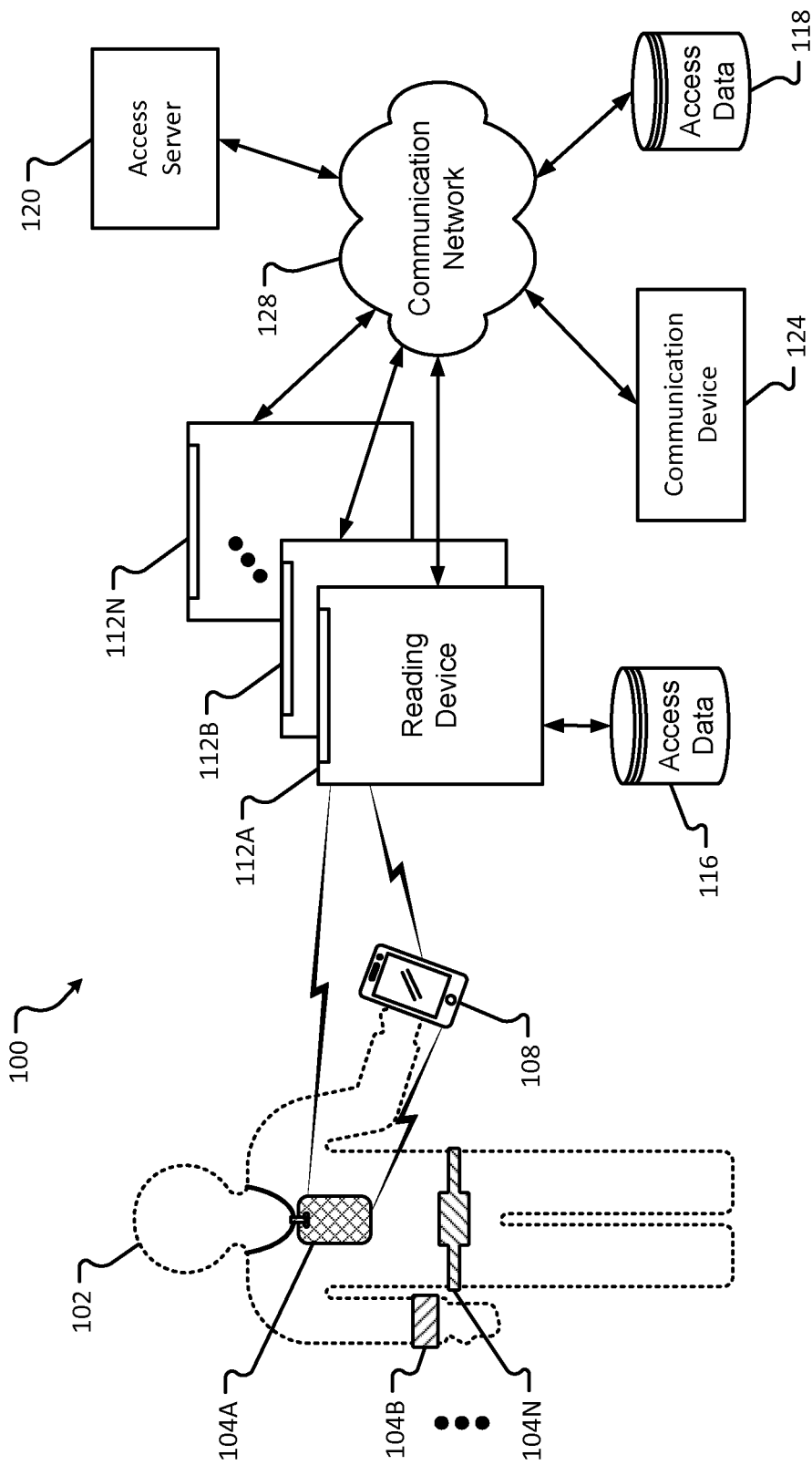
FIG. 1 is a diagram depicting an access control system in accordance with embodiments of the present disclosure.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

According to one embodiment of the present disclosure, a reader for an access control system comprises a processor, a communication interface in communication with the processor, and a memory for storing instructions for execution by the processor. The instructions, when executed by the processor, cause the processor to authenticate a primary credential device; authenticate a secondary credential device; receive a master key and a derived key via the communication interface, wherein the master key is not apparent from the derived key; verify that the derived key is related to the master key; determine whether the master key and the derived key indicate authorization to access a protected resource; and make an access decision based on the determination of whether the master key and the derived key indicate authorization to access the protected resource.

The determining whether the master key and the derived key indicate authorization to access the protected resource may comprise: accessing a list of authorized keys; and determining whether at least one of the master key and the derived key is included in the list of authorized keys. Additionally or alternatively, the determining whether the master key and the derived key indicate authorization to access the protected resource may comprise determining whether at least one of the master key and the derived key is identical to a key stored in the memory. Also additionally or alternatively, the determining whether the master key and the derived key indicate authorization to access the protected resource may comprise: inputting at least one of the master key and the derived key into an algorithm to obtain an output; and comparing the output with information stored in the memory.

Also, the list of authorized keys may be wirelessly accessed by the reader via the communication interface. At least one of the master key and the derived key may be received over an encrypted communication channel. The authenticating the primary credential device may occur in response to a signal received from the primary credential device. The master key may be incapable of determination with the derived key.

A method according to another embodiment of the present disclosure comprises: receiving a master key at a reader associated with a protected resource; receiving a derived key at the reader, wherein the master key is not apparent from the derived key; determining whether the master key and the derived key indicate authorization to access the protected resource; and making an access decision with respect to the protected resource based, at least in part, on determining whether the master key and the derived key indicate authorization to access the protected resource.

The method may further comprise transmitting, from the reader, a request for at least one of the master key and the derived key. The master key may be received from a primary mobile device. The derived key may be received from a wearable device. The derived key may be received directly from the wearable device. Also, the derived key may be received from the wearable device via a communication channel established between the reader and the primary mobile device.

The method may also further comprise limiting access to the protected resource in response to determining that either the master key or the derived key does not indicate authorization to access the protected resource. The method may further comprise maintaining a list of valid master keys in memory of the reader.

A primary credential device for an access control system according to yet another embodiment of the present disclosure may comprise a processor; a communication interface; and a memory having a key vault for storing a master key and further storing instructions for execution by the processor. The instructions, when executed by the processor, cause the processor to: receive a derived key from a secondary credential device, wherein the master key is not apparent from the derived key; determine whether the derived key is a derivative of the master key; make an access decision based, at least in part, on a determination of whether the derived key is a derivative of the master key; and transmit the access decision to an access control reader.

The instructions, when executed by the processor, may further cause the processor to: receive access control information from the access control reader; and further condition the access decision on receiving the access control information and on receiving the master key. The information received from the access control reader may include a list of authorized keys. The primary credential device may transmit an access granted decision to the access control reader if the master key is on the list of authorized keys and the derived key is a derivative of the master key.

Before any embodiments of the disclosure are explained in further detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

One advantage of mobile devices as credentials, as opposed to, for example, RFID tags, is that mobile devices are generally capable of beyond-near-field communications using communication protocols such as Bluetooth, BLE, Wi-Fi, ZigBee, infrared, sound, light, etc. In access control systems comprising a reader configured to communicate with a mobile device using one or more such communication protocols, the mobile device can communicate information to the reader even when it is not in close proximity to (e.g., more than 1.0m away from) the reader. Additionally, storing credentials on mobile devices, which users typically carry (or wear) for other purposes, allows users to carry fewer objects. And mobile devices are typically equipped with various sensors not included in traditional RFID tags. Still further, mobile devices typically have greater processing power than traditional RFID tags. As described herein, these and other advantages may be exploited to allow the use of master and derivative keys when accessing an access control system, such that if a device having a derivative key is lost or stolen, the device can be easily replaced with another device in which a new derivative key, prepared from the master key, is stored.

FIG. 1 is a diagram depicting an access control system 100 for authenticating a user 102 via wearable devices 104 in accordance with embodiments of the present disclosure. In one embodiment, the access control system 100 comprises at least one reading device 112, at least one wearable device 104, and at least one portable/mobile device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 118 across a communication network 128. The access data memory 118 may be located remotely, locally, and/or locally and remotely, from the reading device 112.

The wearable device 104 and/or the mobile device 108 may be configured to communicate with a reading device 112 across one or more wireless communication connections. These one or more wireless communication connections can include communications via at least one of conventional radio protocols, proximity-based wireless communication protocols, Bluetooth™, BLE, infrared, audible, NFC, RF, and other wireless communication networks and/or protocols. In some cases, communications between the wearable device 104 and the reading device 112 may be established automatically when the wearable device 104 enters an active zone of an interrogating reading device 112. In one embodiment, the active zone of the reading device 112 may be defined as a three-dimensional space where the intensity of RF signals emitted by the reading device 112 exceeds a threshold of sensitivity of the wearable device 104 and the intensity of RF signals emitted by the wearable device 108 exceeds a threshold of sensitivity of the reading device 112.

In some embodiments, the wearable device 104 and/or mobile device 108 may be configured to communicate with a reading device 112 across a communication network 128. The communication network 128 can include communication via at least one of conventional radio networks, wireless communication networks, Zig-Bee, GSM, CDMA, Wi-Fi, and/or using other communication networks and/or protocols as provided herein.

In one embodiment, authentication may be required between the wearable device 104 and the reading device 112 before further communications are enabled. Additionally or alternatively, authentication may be required between the wearable device 104 and the mobile device 108 before further communications are enabled. In any event, the further communications may provide communications in which access control information (e.g., keys, codes, credentials, etc.) are shared. In some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request access control information from the wearable device 104 and/or the mobile device 108. This access control information may be used to validate the wearable device 104 and/or the mobile device 108 to the reading device 112. Validation may include referring to information stored in access data memory 120 or some other memory associated with the wearable device 104 and/or the mobile device 108. Typically, a reading device 112 is associated with a particular physical or logical asset (e.g., a door protecting access to a secure room, a computer lock protecting sensitive information or computer files, a lock on a safe, and the like). In one embodiment, the wearable device 104 and/or the mobile device 108 may be validated via one or more components of the access control system 100. Once the wearable device 104 and/or the mobile device 108 is authenticated, credential information associated with the wearable device 104 may be validated. During this process, the reading device 112 may generate signals facilitating execution of the results of interrogating the wearable device 104 (e.g., engages/disengages a locking mechanism, allows/disallows movement of a monitored article, temporarily disables itself, activates an alarm system, provides access to a computer system, provides access to a particular document, and the like). Alternatively, the access server 120 or some other system backend component may generate such signals.

In accordance with embodiments of the present disclosure, the reading device 112 may collect access control information associated with the wearable device 104 before an access control decision can be made. For example, the reading device 112 may require credential information stored on the wearable device 104 to validate the wearable device 104. The validity of the wearable device 104 may be based on the validity of an associated mobile device 108, or vice versa. In one embodiment, upon validating credential information stored on the wearable device 104, the reading device 112 generates signals facilitating execution of the results of interrogating the wearable device 104 and/or the mobile device 108 (e.g., engages/disengages a locking mechanism, allows/disallows movement of a monitored article, temporarily disables itself, activates an alarm system, provides access to a computer system, provides access to a particular document, and the like). As provided above, the access server 120 may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 118. Like the memory of the access server 120, the access data memory 118 may comprise a solid state memory or devices. The access data memory 118 may comprise a hard disk drive or other random access memory.

In some embodiments, the reading device 112 may be configured to communicate with one or more devices across a communication network 128. For example, the reading device 112 may communicate with a wearable device 104 and/or a mobile device 108 across the communication network 128. Among other things, this communication can allow for back-end authentication and/or provide notifications from the reading device 112 to the mobile device 108. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the wearable device 104 via the reading device 112.

Figure 2:
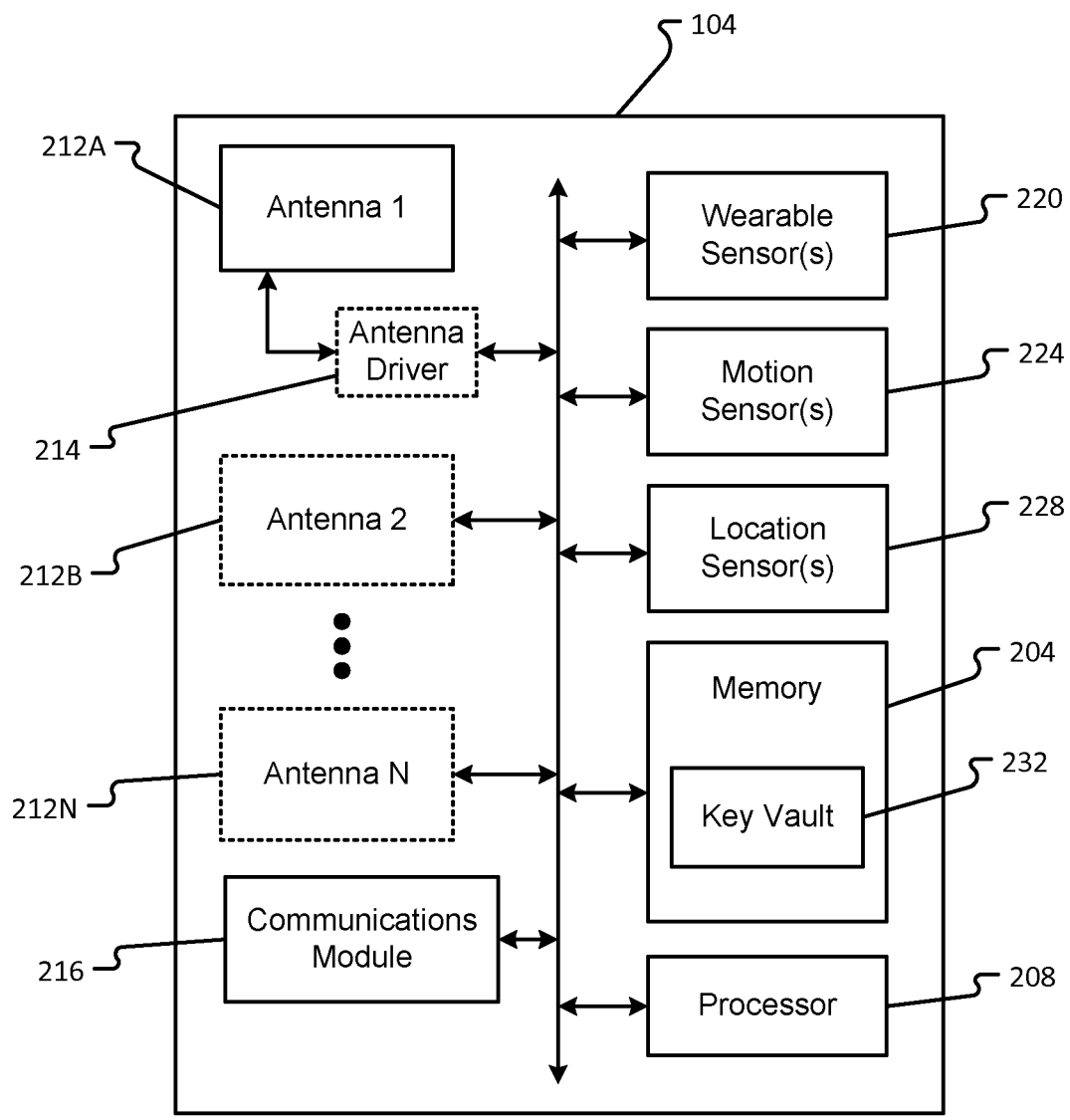
FIG. 2 is a block diagram depicting a wearable device or components thereof in accordance with embodiments of the present disclosure.

Referring now to FIG. 2, a block diagram depicting a wearable device 104 is shown in accordance with embodiments of the present disclosure. The wearable device 104 may include one or more components, such as, a memory 204, a processor 208, an antenna 212A-N, a communications module 216, a wearable sensor 220, a motion sensor 224, and a location sensor 228. In some embodiments, the wearable device 104 may further include a power module. The processor 208 may be an application specific integrated circuit (ASIC), microprocessor, programmable controller, or the like. The mobile device 104 may be provided with a key vault 232 that stores one or a plurality of keys. The key(s) may be communicated to a reader 112 in connection with a holder of the mobile device 104 attempting to gain access to an asset protected by the reader 112.

The memory 204 of the wearable device 104 may be used in connection with the execution of application programming or instructions by the processor 208, and for the temporary or long term storage of program instructions and/or data. The memory 204 may contain executable functions that are used by the processor 208 to run other components of the wearable device 104. In one embodiment, the memory 204 may be configured to store credential information and/or access control information. For instance, the credential information/access control information may include, but is not limited to, unique identifications, manufacturer identification, passwords, keys, encryption schemes, transmission protocols, and the like. As examples, the memory 204 may comprise RAM, DRAM, SDRAM, or other solid state memory.

The one or more antennas 212A-N may be configured to enable wireless communications between the wearable device 104 and a reading device 112 and/or a mobile device 108. As can be appreciated, the antenna(s) 212A-N may be arranged to operate using one or more wireless communication protocols and operating frequencies including, but not limited to, Bluetooth®, NFC, Zig-Bee, GSM, CDMA, Wi-Fi, RF, and the like. By way of example, the antenna(s) 212A-N may be RF antenna(s), and as such, may transmit RF signals through free-space to be received by a reading device 112 having an RF transceiver.

In some embodiments, the wearable device 104 may include a power module. The power module may be configured to provide power to the parts of the wearable device 104 in order to operate. The power module may store power in a capacitor of the power module. In one embodiment, electronics in the power module may store energy in the capacitor and turn off when an RF field is present. This arrangement can ensure that energy is presented to the wearable device 104 minimizing any effect on read distance. Although the wearable device 104 may be configured to receive power passively from an electrical field of a reading device 112, it should be appreciated that the wearable device 104 may provide its own power. For example, the power module may include a battery or other power source to supply power to parts of the wearable device 104.

The wearable device 104 may include a communications module 216 that is configured to communicate with one or more different systems or devices either remotely or locally to the wearable device 104. Thus, the communications module 216 can send or receive messages from other wearable devices 104, from mobile devices 108, from reading devices 112, from communication devices 124, from access servers 120, from access control systems, or from other systems. In some embodiments, the communicated information may be provided to, or exchanged with, other components within the wearable device 104.

Embodiments of the wearable device 104 may include at least one wearable sensor 220. Among other things, the wearable sensor 220 may be configured to detect an attachment and/or detachment of the wearable device 104 to a user 102. For instance, a wearable device 104 may include a clasp that is required to be opened in attaching and/or removing the wearable device 104 from a user 102 (e.g., similar to a clasp of a watch band, bracelet, earring, necklace, etc.). The actuation of the clasp may be detected by a wearable sensor 220 of the wearable device 104. Examples of other wearable sensors 220 may include, but are in no way limited to, contact sensors, switches, proximity sensors, etc., and/or combinations thereof.

In some embodiments, the wearable device 104 may employ one or more sensors 220, 224, 228 that are configured to detect information corresponding to a state of the wearable device 104. The wearable sensors 220 may include, but are not limited to, one or more biometric sensors (e.g., heart rate, body temperature and/or heat signature, blood pressure, etc.), capacitive sensors, light sensors, temperature sensors, pressure sensors, contact sensors, combinations thereof, and the like. It is an aspect of the present disclosure that the processor 208 of the wearable device 104 may receive the sensor information and determine whether the wearable device 104 is being worn by a user 102, whether the wearable device 104 has been removed from a user 102, whether any interruption to the wearing of the wearable device 104 is detected (e.g., whether the wearable device 104 has been continuously worn by, and/or removed from, a user 102, timing associated therewith, etc.). By way of example, the biometric sensor of the wearable sensors 220 may detect biometric characteristics associated with a user 102 wearing the wearable device 104 (e.g., a heart rate, a blood pressure, a body temperature, skin contact data, etc.). The biometric characteristics may be used to determine a state of the wearable device 104 (e.g., being worn or not, etc.) and/or determine an identity of a user 102 wearing the wearable device 104 (e.g., via comparing collected biometric characteristics to baseline characteristics stored in a memory and associated with the user 102, etc.).

The motion sensors 224 may include one or more of a gyroscope, accelerometer, transducer, and/or other mechanical detection component that are each configured to detect a force and/or motion associated with the wearable device 104. This detected motion of the wearable device 104 may be compared, via the processor 208 of the wearable device 104, to known motion profiles stored in the memory 204 or other associated memory in determining a state of the wearable device 104. For instance, a particular motion of the wearable device 104 may indicate that the wearable device 104 is being worn by a user 102. In one embodiment, the detected motion of a wearable device 104 may be compared to the detected motion of an associated mobile device 108, or vice versa, to generate comparison results. The mobile device 108 may be associated with the wearable device 104, or the mobile device 108 may be associated with a user 102 having the wearable device 104. In any event, the comparison results may indicate similarities between the motion of the wearable device 104 and a motion of the mobile device 108 over time. Similar motion comparison results between the wearable device 104 and the mobile device 108 may allow a continuous authentication for the user 102. Additionally, motion comparison results (or simply detected motion information) may be used by the wearable device 104, the mobile device 108, and/or the reader 112 to assist in making an ingress or egress determination for the mobile device 108 and/or the wearable device 104. Dissimilar motion comparison results between the wearable device 104 and the mobile device 108 may be used to disable or discontinue the continuous authentication for the user 102. In one embodiment, an extreme motion detected at one device (e.g., the wearable device 104 or the mobile device 108) but not the other device may cause continuous authentication to be broken, discontinued, and/or disallowed.

The wearable device 104 may include one or more location sensors 228. The location sensors may be configured to determine a geographical location and/or position of the wearable device 104. In one embodiment, this location may be based on Global Positioning System (GPS) data provided by a GPS module of the wearable device 104. In some embodiments, the location of the wearable device 104 may be provided based on cell tower data, Wi-Fi information, iBeacon information, and/or some other location information provided by a location module and/or a communications module 216 of the wearable device 104. The location of a mobile device 108 may be determined in a similar, if not identical, manner as determining the location of the wearable device 104. Although location information may not always be available inside buildings or other structures, location information provided by the one or more location sensors 228 may be used, where available, to make an ingress or egress determination for the wearable device 104 and/or the mobile device 108.

Figure 3:
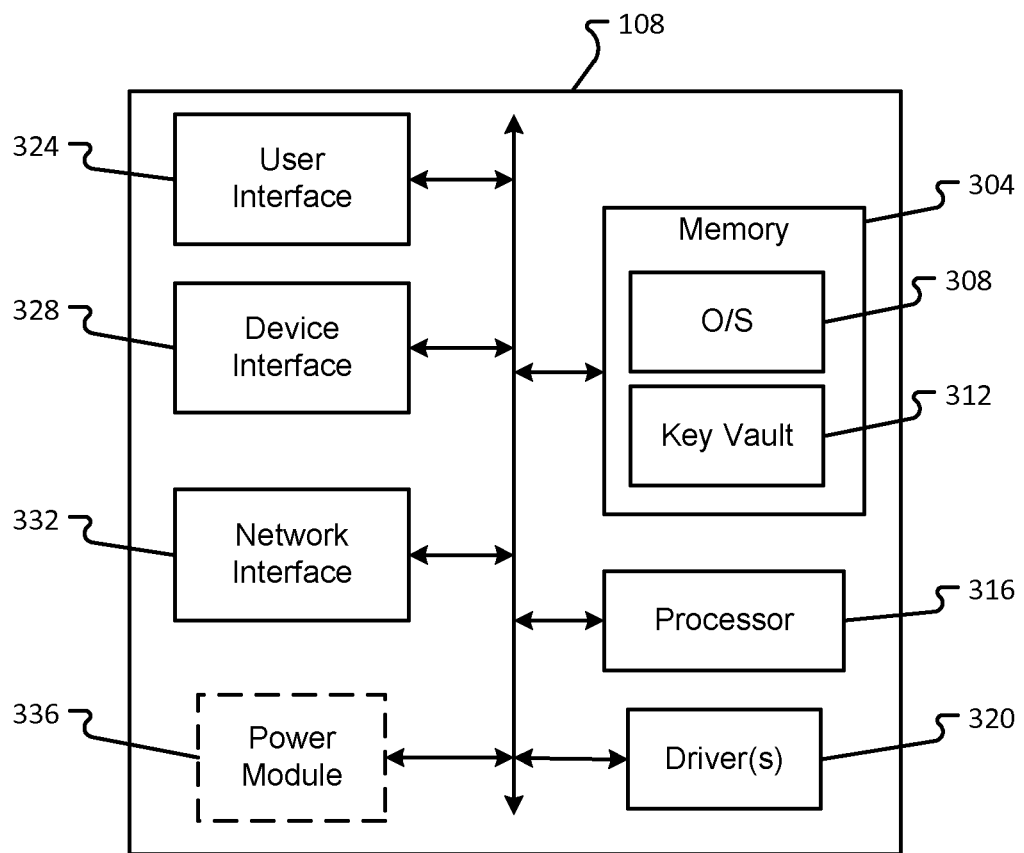
FIG. 3 is a block diagram depicting a mobile device or components thereof in accordance with embodiments of the present disclosure

FIG. 3 shows a block diagram depicting a mobile device 108 in accordance with embodiments of the present disclosure. The mobile device 108 may correspond to any type of electronic device and, as the name suggests, the electronic device may be portable in nature. As some examples, the mobile device 108 may correspond to a cellular phone or smartphone carried by a user. Other examples of a mobile device 108 include, without limitation, wearable devices (e.g., glasses, watches, shoes, clothes, jewelry, wristbands, stickers, etc.). The mobile device 108, as shown in FIGS. 1 and 3, may be provided with a key vault 312 that stores one or a plurality of keys. The key(s) may be communicated to a reader 112 in connection with a holder of the mobile device 108 attempting to gain access to an asset protected by the reader 112. As an example, the mobile device 108 may be presented to the reader 112 by a user 102 or holder of the mobile device 108.

If NFC is being used for the communication channel, then the reader 112 and mobile device 108 may have their interfaces/antennas inductively coupled to one another at which point the reader and/or mobile device 108 will authenticate or mutually authenticate with one another. Following authentication, the reader 112 may request a key or multiple keys from the mobile device 108, or the mobile device 108 may offer a key or multiple keys to the reader 112. Upon receiving the key(s) from the mobile device 108, the reader 112 may analyze the key(s) and determine if the key(s) are valid and, if so, allow the holder/user of the mobile device 108 access to the asset protected by the reader 112. It should be appreciated that the mobile device 108 may alternatively or additionally be configured to analyze information received from the reader 112 in connection with making an access control decision and/or in connection with making a decision whether or not to provide key(s) to the reader 112. Examples of technologies that can be used by the mobile device 108 to make an access control decision for itself are further described in U.S. Pat. No. 8,074,271 to Davis et al. and U.S. Pat. No. 7,706,778 to Lowe, both of which are hereby incorporated herein by reference in their entirety.

If BLE or some other non-inductive protocol (e.g., Wi-Fi) is being used for the communication channel, then the reader 112 and mobile device 108 may perform a discovery routine prior to pairing with one another or otherwise connecting to establish the communication channel. After the channel is established, however, the reader 112 and mobile device 108 may then authenticate one another and exchange relevant information, such as the key(s), to enable an access control decision to be made. If a positive access control decision is made (e.g., if it is determined that the key(s) are valid and the mobile device 108 is allowed to access the asset protected by the reader 112), then the reader 112 may initiate one or more actions to enable the holder/user 102 of the mobile device 108 to access the asset protected by the reader 112.

The mobile device 108 is shown to include computer memory 304 that stores one or more Operating Systems (O/S) 308 and a key vault 312, among other items. The mobile device 108 is also shown to include a processor 316, one or more drivers 320, a user interface 324, a reader interface 328, a network interface 332, and a power module 336. Suitable examples of a mobile device 108 include, without limitation, smart phones, PDAs, laptops, PCs, tablets, netbooks, wearable devices, and the like.

The memory 304 may correspond to any type of non-transitory computer-readable medium. In some embodiments, the memory 304 may comprise volatile or non-volatile memory and a controller for the same. Non-limiting examples of memory 304 that may be utilized in the mobile device 108 include RAM, ROM, buffer memory, flash memory, solid-state memory, or variants thereof.

The 0/S 308 may correspond to one or multiple operating systems. The nature of the 0/S 308 may depend upon the hardware of the mobile device 108 and the form factor of the mobile device 108. The 0/S 308 may be viewed as an application stored in memory 304 that is processor-executable. The 0/S 308 is a particular type of general-purpose application that enables other applications stored in memory 304 (e.g., a browser, an email application, an SMS application, etc.) to leverage the various hardware components and driver(s) 320 of the mobile device 108. In some embodiments, the 0/S 308 may comprise one or more APIs that facilitate an application's interaction with certain hardware components of the mobile device 108. Furthermore, the 0/S 308 may provide a mechanism for viewing and accessing the various applications stored in memory 304 and other data stored in memory 304.

The processor 316 may correspond to one or many microprocessors that are contained within the housing of the mobile device 108 with the memory 304. In some embodiments, the processor 316 incorporates the functions of the user device's Central Processing Unit (CPU) on a single Integrated Circuit (IC) or a few IC chips. The processor 316 may be a multipurpose, programmable device that accepts digital data as input, processes the digital data according to instructions stored in its internal memory, and provides results as output. The processor 316 implements sequential digital logic as it has internal memory. As with most known microprocessors, the processor 316 may operate on numbers and symbols represented in the binary numeral system.

The driver(s) 320 may correspond to hardware, software, and/or controllers that provide specific instructions to hardware components of the mobile device 108, thereby facilitating their operation. For instance, the user interface 324, reader interface 328, and network interface 332, may each have a dedicated driver 320 that provides appropriate control signals to effect their operation. The driver(s) 320 may also comprise the software or logic circuits that ensure the various hardware components are controlled appropriately and in accordance with desired protocols. For instance, the driver 320 of the reader interface 328 may be adapted to ensure that the reader interface 328 follows the appropriate proximity-based protocols (e.g., BLE, NFC, Infrared, Ultrasonic, IEEE 802.11N, etc.) such that the reader interface 328 can exchange communications with the credential. Likewise, the driver 320 of the network interface 332 may be adapted to ensure that the network interface 332 follows the appropriate network communication protocols (e.g., TCP/IP (at one or more layers in the OSI model), UDP, RTP, GSM, LTE, Wi-Fi, etc.) such that the network interface 332 can exchange communications via the communication network 128. As can be appreciated, the driver(s) 320 may also be configured to control wired hardware components (e.g., a USB driver, an Ethernet driver, etc.).

As mentioned above, the user interface 324 may comprise one or more user input devices and/or one or more user output devices. Examples of suitable user input devices that may be included in the user interface 324 include, without limitation, buttons, keyboards, mouse, touch-sensitive surfaces, pen, camera, microphone, etc. Examples of suitable user output devices that may be included in the user interface 324 include, without limitation, display screens, touchscreens, lights, speakers, etc. It should be appreciated that the user interface 324 may also include a combined user input and user output device, such as a touch-sensitive display or the like.

The reader interface 328 may correspond to the hardware that facilitates communications with the credential for the mobile device 108. The reader interface 328 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 328 is specifically provided to facilitate proximity-based communications with a credential via communication channel or multiple communication channels.

The network interface 332 may comprise hardware that facilitates communications with other communication devices over the communication network 128. As mentioned above, the network interface 332 may include an Ethernet port, a Wi-Fi card, a Network Interface Card (NIC), a cellular interface (e.g., antenna, filters, and associated circuitry), or the like. The network interface 332 may be configured to facilitate a connection between the mobile device 108 and the communication network 128 and may further be configured to encode and decode communications (e.g., packets) according to a protocol utilized by the communication network 128.

The power module 336 may include a built-in power supply (e.g., battery) and/or a power converter that facilitates the conversion of externally-supplied AC power into DC power that is used to power the various components of the mobile device 108. In some embodiments, the power module 336 may also include some implementation of surge protection circuitry to protect the components of the mobile device 108 from power surges.

Figure 4:
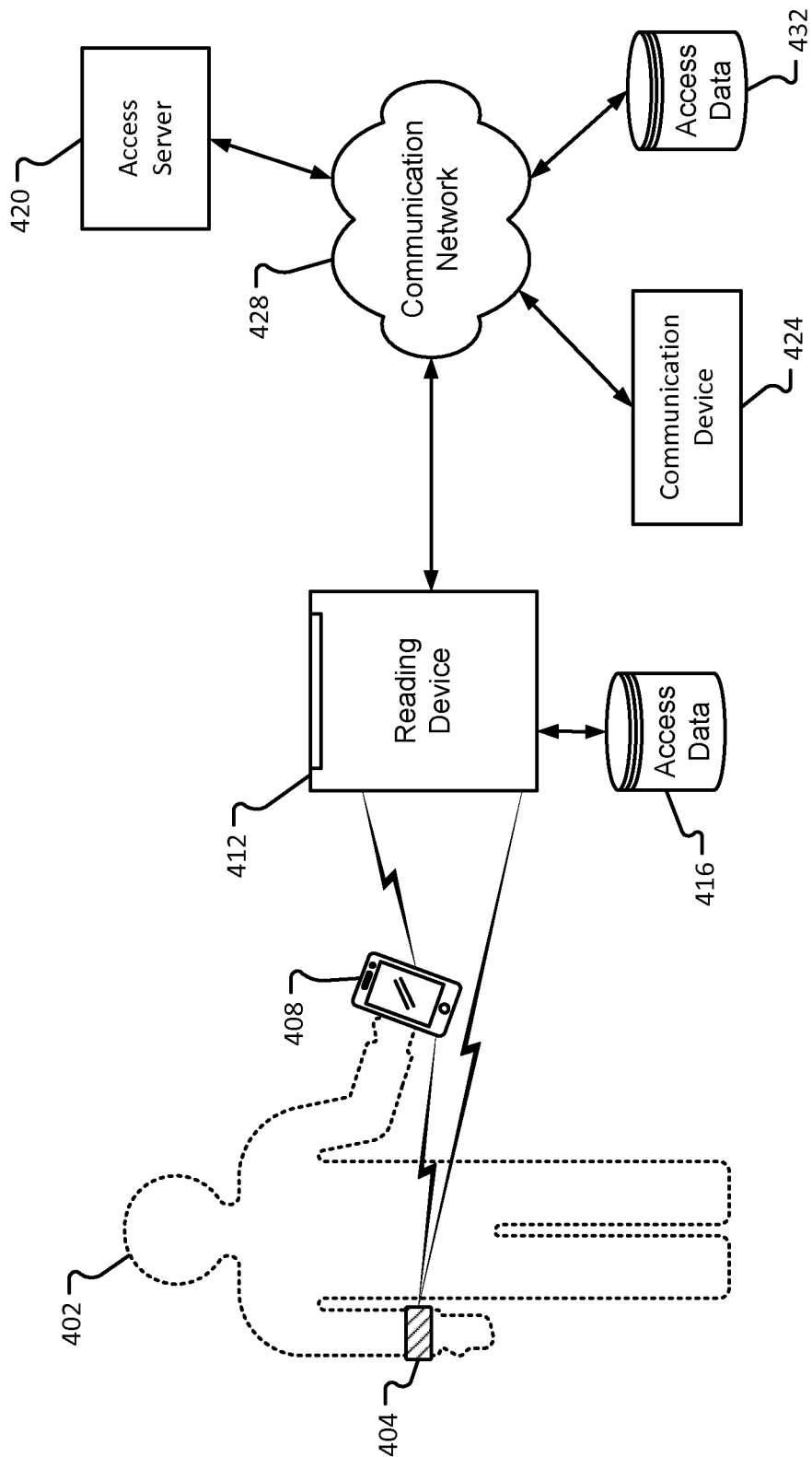
FIG. 4 is a diagram depicting an access control system in accordance with another embodiment of the present disclosure.

Referring now to FIG. 4, in one embodiment of the present disclosure, the primary credential device 408 is a mobile device having the same or similar structure as the mobile device 108 and the secondary credential device 404 is a wearable mobile device having the same or similar structure as the wearable mobile device 104. A mobile key is stored in the memory 304 of the primary credential device 408 and in the memory 204 of the secondary credential device 404. The mobile keys may be stored in a key vault 312 or 232 of the primary credential device 408 and the secondary credential device 404, respectively. Both of the mobile keys are required to gain access to a protected resource. The mobile key on the primary credential device 408 is a master key. The mobile key on the secondary credential device 404 is derived from the master key (e.g. the mobile key on the primary credential device 408), using any key derivation function. Preferably, the master key cannot be easily or readily determined from the derived key. For example, the derived key may be a hash of the master key. A backup copy of the derived key may be stored separately from the secondary credential device 404.

Figure 5:
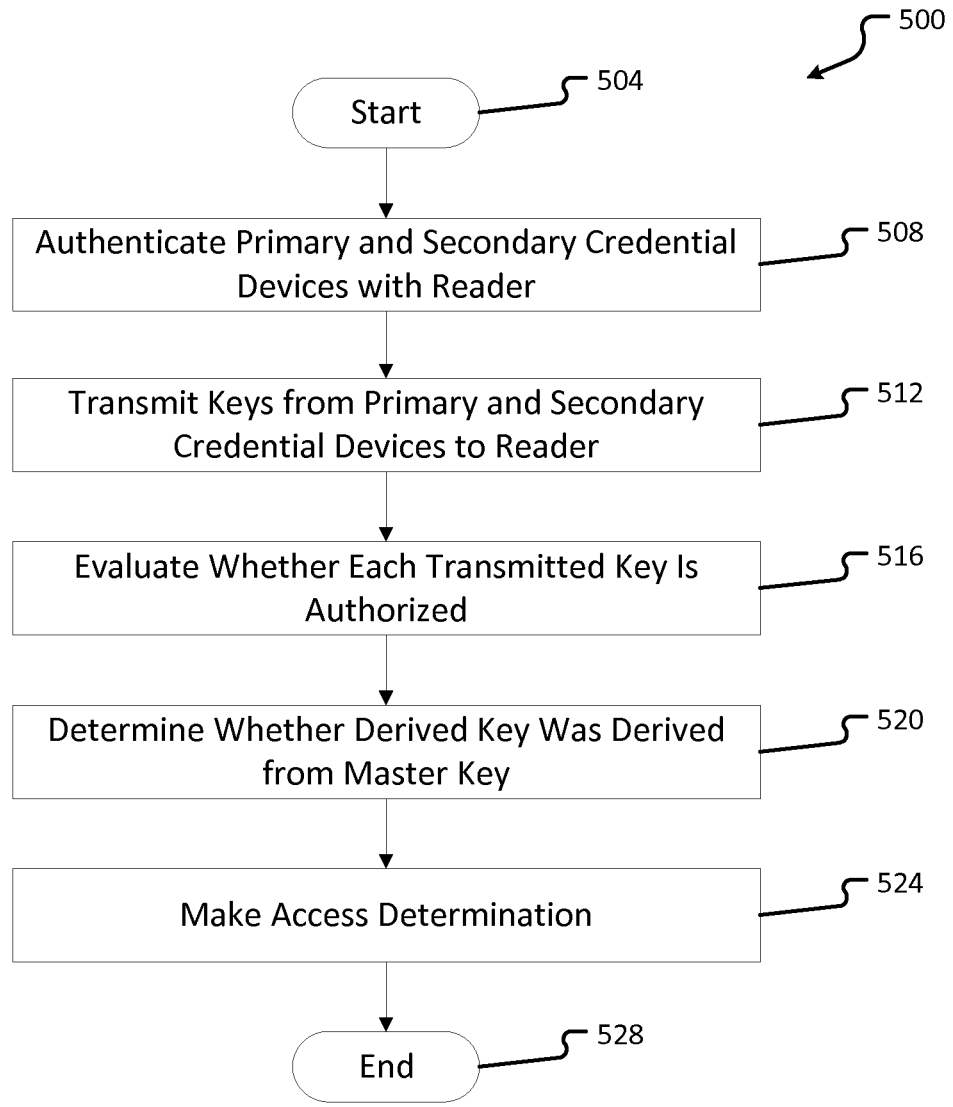
FIG. 5 is a flowchart depicting a method according to embodiments of the present disclosure.

FIG. 5 depicts a flowchart of a method 500 according to an embodiment of the present disclosure, which method begins at step 504. A user 402 seeking access to a protected resource presents the primary credential device 408 and the secondary credential device 404 to an access control reader 412 associated with an access point to the protected resource, and the reader 412 authenticates each device (step 508). This process may occur automatically, or manual intervention may be required. For example, the reader 412 may periodically broadcast a signal that, when received by one or both of the primary credential device 408 and the secondary credential device 404, causes the primary credential device 408 and/or the secondary credential device 404 to respond to the reader 412, which response may initiate an authentication process. Alternatively, the primary mobile device 408 and/or the secondary mobile device 404 may periodically broadcast a signal that, when received by the reader 412, causes the reader 412 to respond to the signal, which response may initiate an authentication process. In embodiments, only one of the primary credential device 408 and the secondary credential device 404 participates in such initial communications (e.g. periodically broadcasting a signal and/or monitoring for receipt of such a signal), and the participating device notifies the non-participating device as soon as authentication is needed, or as part of the authentication process. In still other embodiments, communication between one or both of the primary credential device 408 and the secondary credential device 404 on the one hand and the reader 412 on the other begins when the user 402, using a user interface of one or both of the primary credential device 408 and the secondary credential device 404, commands the respective device to initiate communication with the reader 412, or to broadcast a signal to determine whether there are any readers within communication range, or the like. As just one non-limiting example, the command may be in the form of selecting the reader 412 from a list of readers within communication range.

In some embodiments, the authentication of the primary credential device 408 and of the secondary credential device 404 may be provided via one-way or mutual authentication. Examples of authentication may include, but are not limited to, simple authentication based on site codes, trusted data formats, shared secrets, and/or the like.

The primary credential device 408 and the secondary credential device 404, having been authenticated by the reader 412 and/or vice versa, each transmits its respective mobile key to the reader 412 (step 512). The master and derived mobile keys may be transmitted over an encrypted or otherwise secured communication channel between the primary credential device 408 or the secondary credential device 404, respectively, and the reader 412. In embodiments, the key vault 312 or 232 in which the mobile key is stored may be physically or logically disconnected from the processor 316 or 208 of the primary credential device 408 or secondary credential device 404, respectively, unless and until one or more access criteria are satisfied. Such access criteria may be or include, for example, successful authentication with a recognized reader, input by the user of a proper password or other access information (e.g. biometric information, motion information, etc.), whether via a user interface of the device in question, one or more sensors of the device in question, or the like. A physical or electronic switch may be activated once the one or more access criteria are satisfied, thus allowing the processor 316 or 208 to retrieve the respective mobile keys from the key vault 312 or 232 of the primary credential device 408 or secondary credential device 404. Once the keys are retrieved, the processor 316 or 208 can cause the keys to be transmitted to the reader 412.

The reader 412 evaluates each key independently to determine whether the key is authorized (step 516). To complete this evaluation, the reader 412 may reference access information stored in the access data memory 416 or in the access data memory 432. For example, the reader 412 (and more specifically, a processor thereof) may compare the received keys with keys stored in memory to see if they are identical. As another example, the reader 412 may input one or both of the received keys into one or more algorithms and compare the result with information stored in the memory 416 or 432. As yet another example, the received keys may define algorithms into which a value stored in memory is input, and the result may be compared with information stored in the memory 416 or 432. Additionally, the reader 412 may send the received keys to the access server 420 via the communication network 428, and the access server 420, rather than the reader 412, may complete the evaluation of step 516.

For added security, the reader 412 (or, in embodiments, the access server 420) may also evaluate whether the derived key is a derivative of the master key (step 520). Thus, if each user of the access control system is issued a unique master key, the reader 412 can verify that the secondary credential device 404 belongs to the owner of the primary credential device 408—or, at least, that the holder of the secondary credential device 404 has access to the master key and to the proper key derivation function. As an alternative to evaluating whether both keys are authorized, the reader 412 may evaluate only whether the master key is authorized, in addition to evaluating whether the derived key is in fact a derivative of the master key.

Once the reader 412 (or the access server 420) has determined whether the keys received from the primary credential device 408 and the secondary credential device 404 are authorized, the reader 412 makes an access determination (step 524). If the keys are authorized, the reader 412 grants access to the protected resource, whether by operating a lock mechanism, opening a door, deactivating an alarm or other security measure, or the like. If the keys are not authorized, then the reader 412 maintains the closure of the access point and the security of the protected resource, and may also trigger an alarm. Once an access determination has been made, the method terminates (step 528).

In this embodiment, if the user 402 loses or is otherwise separated from the secondary credential device 404 (containing the derived key), security is maintained because the derived key can only be used to gain access to the protected resource in conjunction with the master key, which is not stored on the secondary credential device 404. If extra security is desired, then the derived key (a copy of which has been stored separately from the secondary credential device 404) can be deactivated. This may be accomplished by removing the derived key from a list of authorized keys that is stored on or otherwise accessible to the readers 412 of the access control system in question, or it could be accomplished by adding the derived key to a "blacklist" of keys for which access is forbidden, which blacklist is stored on or otherwise accessible to the readers 412 of the access control system in question. For example, such a blacklist could be stored in the access data memory 416 of the reader 412, or in the access data memory 432 accessible to the reader 412 via the communication network 428.

Additionally, replacement of the derived key is relatively simple. The user (or a system administrator) may generate a new derivative key using the master key on the primary credential device 408, which can be stored in a replacement secondary credential device 404 (and, if needed, added to a list of authorized keys to be referenced by access control readers, which list may be stored, for example, in a memory 416 or 432). Loss of the original secondary credential device 404 therefore does not compromise the master key or necessitate creation or issuance of a new master key.

Figure 6:
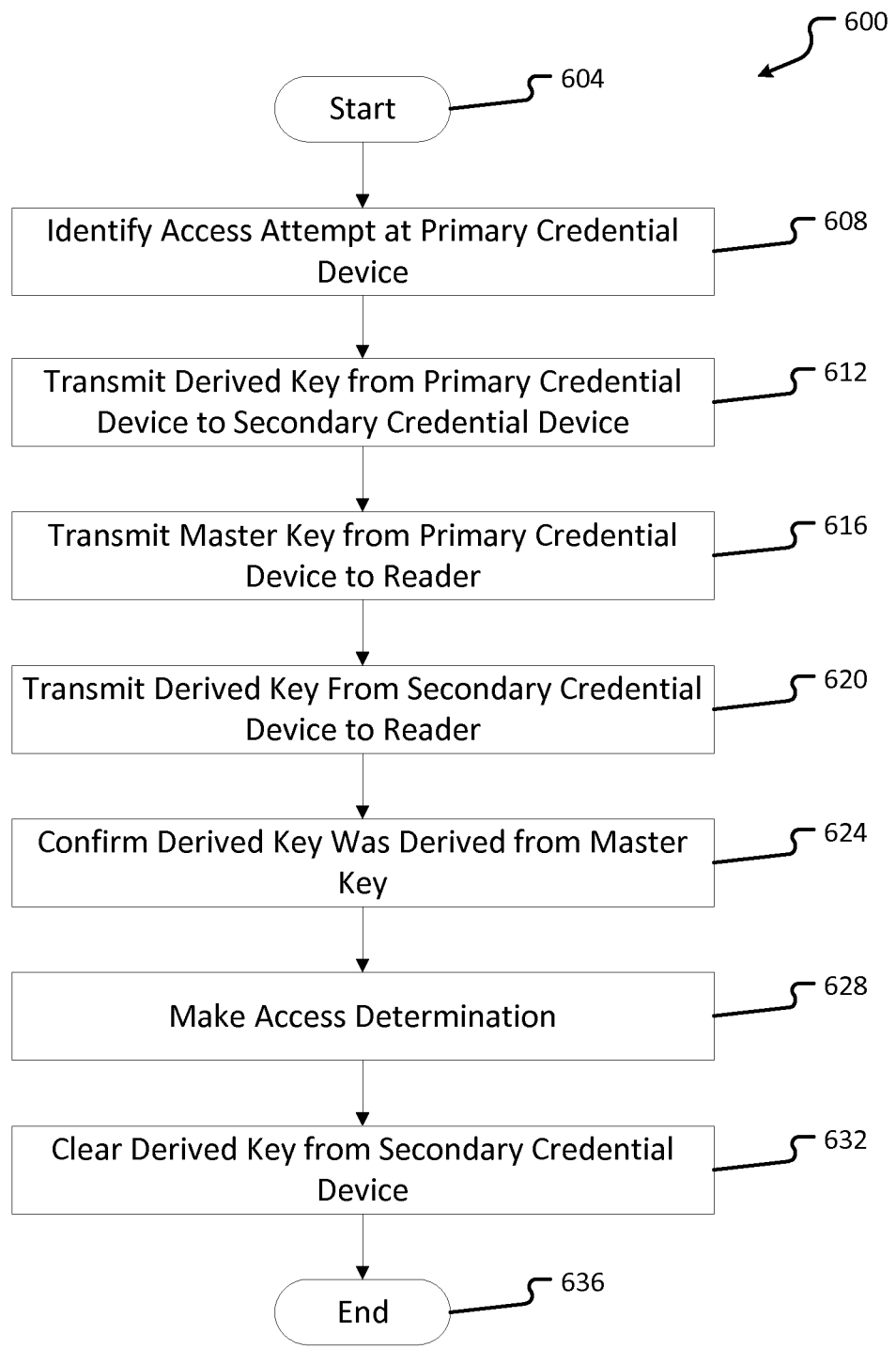
FIG. 6 is a flowchart depicting a method according to other embodiments of the present disclosure.

With reference now to FIG. 6 and in a method 600 according to another embodiment of the present disclosure, when a user 402 approaches an access control reader 412 to gain access to a protected resource, a primary credential device 408 holding a master key (e.g. in a key vault 312) identifies an access attempt (step 608). The identification may be automatic, whether as a result of receiving a signal from the reader 412, receiving a sensor input that correlates with proximity to the reader 412 (e.g. a location sensor may detect that the primary credential device 408 is within a given distance of the known position of the reader 412, or a network interface may detect a Wi-Fi network known to be associated with the reader 412), or the like. Alternatively, the identification may be the result of a manual indication by the user 402 of the primary credential device 408, through the user interface 324 of the device 408, that the user 402 would like the primary credential device 408 to initiate the access process with the reader 412. For example, the user 402 may open an app on the primary credential device 408, select the reader 412 from a list of readers within communication range, and press or otherwise activate a digital button that causes the primary credential device 408 to establish communications with the reader 412. Alternatively, the primary credential device 408 may detect the proximity of the reader 412 automatically, and present a question to the user 402 via the user interface 324 asking whether the user 402 would like the primary credential device 408 to establish communications (for the purposes of gaining access) with the reader 412. The foregoing examples are not intended to be limiting.

Once an access attempt has been identified, the primary credential device 408 sends a derived key, based on the master key stored in the memory 304 of the primary credential device 408, to the secondary credential device (step 612). The primary credential device 408 (or, more specifically, the processor 316 of the primary credential device 408) may generate the derived key after identifying the access attempt, or the processor 316 may generate and store the derived key based on some trigger other than the identification of the access attempt. Algorithms and methods for generating a derived key from a master key are known in the art, and any such algorithm or method may be used within the scope of the present disclosure. In embodiments, the primary credential device 408 may establish a secure communication channel with the secondary credential device 404 before sending the derived key to the secondary credential device 404. Methods and techniques for established secure communication channels are known in the art, and any such methods and techniques may be used to establish a secure communication channel within the scope of the present disclosure.

The primary credential device 408 also transmits a master key from the primary credential device 408 to the reader 412. Transmission of the master key from the primary credential device 408 to the reader 412 may occur before, after, or simultaneously with the transmission of the derived key from the primary credential device 408 to the secondary credential device 404. Here again, the primary credential device 408 may, in embodiments, establish a secure communication channel with the reader 412 before transmitting the master key to the reader 412. Additionally, the primary credential device 408 may use any available communication protocol (e.g. any communication protocol that both the primary credential device 408 and the reader 412 are equipped to utilize) to transmit the master key to the reader 412. The communication protocol may be the same protocol used by the primary credential device 408 to transmit the derived key to the secondary credential device 404, or it may be a different protocol, for example to enhance security by increasing the difficulty of intercepting both the master key and the derived key upon transmission thereof to the reader 412 and to the secondary credential device 404, respectively.

The secondary credential device 404 also sends, to the reader 412, the derived key that it received from the primary credential device 408 (step 620). Similarly to step 616, the secondary credential device 404 may, in embodiments, establish a secure communication channel with the reader 412 before transmitting the derived key to the reader 412. The secondary credential device 404 may use any available communication protocol (e.g. any communication protocol that both the secondary credential device 404 and the reader 412 are equipped to utilize) to transmit the derived key to the reader 412. The communication protocol may be the same protocol used by the primary credential device 408 to transmit the derived key to the secondary credential device 404 and/or the same protocol used by the primary credential device 408 to transmit the master key to the reader 412, or it may be a different protocol, for example to enhance security by increasing the difficulty of intercepting both the master key and the derived key upon transmission thereof to the reader 412 by the primary credential device 408 and the secondary credential device 404, respectively Once the reader 412 has received both the master key and the derived key, the reader 412 (or, more specifically, a processor thereof) verifies that the master key is authorized and also that the derived key is a derivative of the master key (step 624), and makes an access determination (e.g. grants access if the verification is successful, denies access if not) (step 628). A grant access determination may cause the reader 412 to operate a lock mechanism, open a door, deactivate an alarm or other security measure, or the like. A deny access determination may cause the reader 412 to maintain the closure of the access point and the security of the protected resource, and may also cause the reader 412 to trigger an alarm.

Also as part of the method 600, the reader 412 sends an indication to the secondary credential device 404 that an access determination has been made, upon receipt of which the secondary credential device 404 deletes or otherwise clears the derived key from its memory 204 (step 632). Thus, in this embodiment, the derived key is only stored in the memory 204 of the secondary credential device 404 for a limited period of time, and only when the secondary credential device 404 is presented to an access control reader 412 together with the primary credential device 408.

As a result, if the user 402 loses possession of the secondary credential device 404, security is maintained. If an unauthorized individual gains possession of the original secondary credential device 404, he or she will not have the master key or a derived key, and will be unable to gain access to the protected resource. The authorized user 402, however, can still obtain access to the protected resource using the primary credential device 408 and a different device as a secondary credential device, provided that the different secondary credential device can communicate with the primary credential device 408 and the reader 412.

Figure 7:
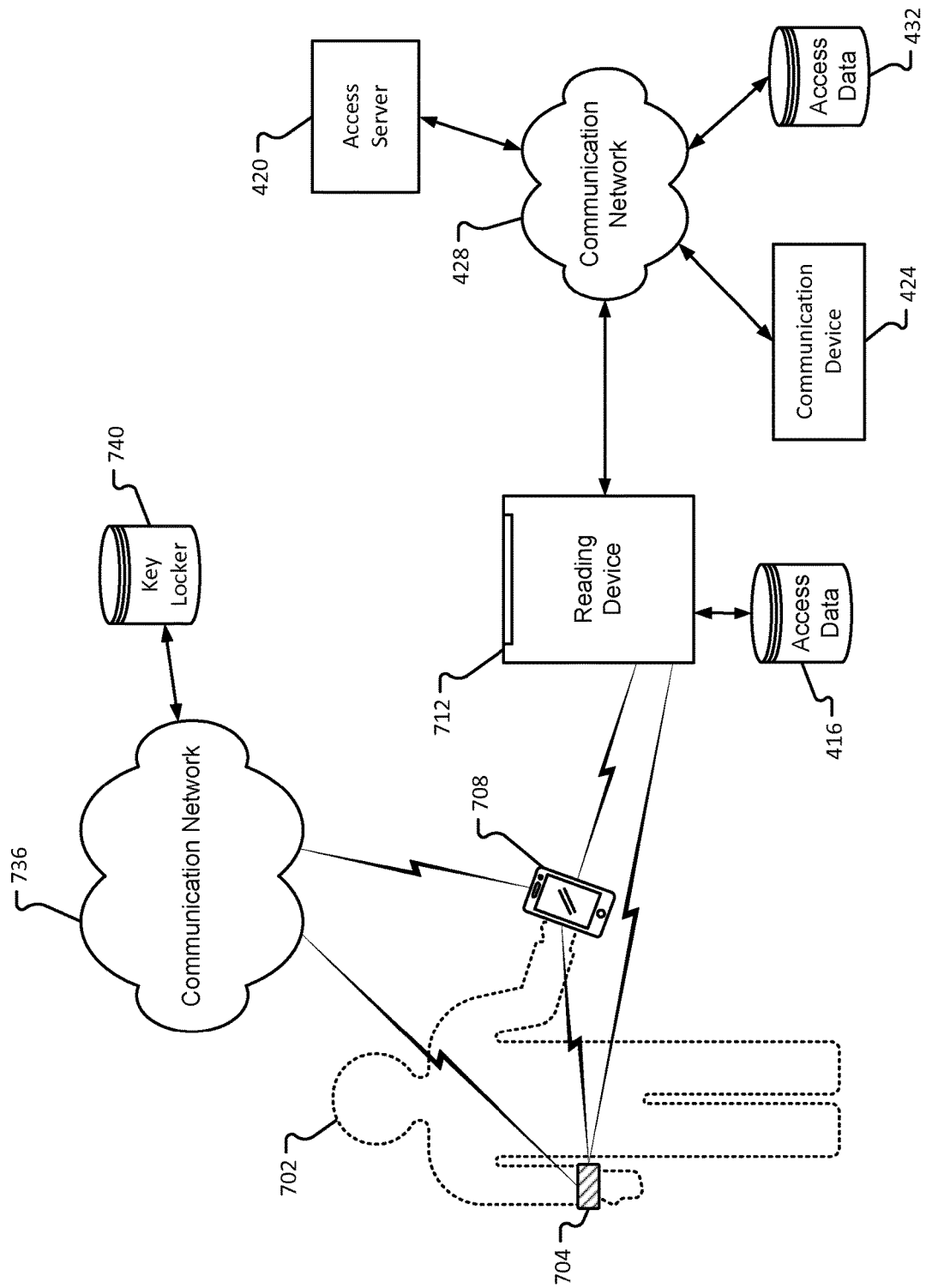
FIG. 7 is a diagram depicting an access control system in accordance with yet another embodiment of the present disclosure.

Turning now to FIG. 7, in accordance with yet another embodiment of the present disclosure, a cloud-based key locker 740 holds a copy of the master key from a primary credential device 708 (or, in some embodiments, holds the original master key), together with one or more keys derived from the master key. If the primary credential device 708 does not already have a master key stored in the memory 304 (or the key vault 312) thereof, the primary credential device 708 is configured to obtain a master key from the key locker 740, e.g. by establishing a communication channel with the key locker 740 via the communication network 736. Similarly, a secondary credential device 704 is configured to obtain a derived key from the key locker 740, e.g. by establishing a communication channel with the key locker 740 via the communication network 736. The secondary credential device 704 may request the derived key from the key locker 740 in response to, or after engaging in, communications with an access control reader 712. The communication channel(s) between the primary credential device 708 and/or the secondary credential device 704 on the one hand, and the key locker 740 on the other, may be encrypted or otherwise secure. Also, the key locker 740 may contain master keys and associated derivative keys for multiple different access control systems. Consequently, the primary credential device 708 and/or the secondary credential device 704 may send information identifying the access control system and/or a component thereof (e.g. the reader 712) to the key locker 740, and the key locker 740 may use the identification information to return a master key or a derived key to the primary credential device 708 or the secondary credential device 704, respectively, that corresponds to the access control system or reader 712 identified by the information.

Once obtained, the master key and the derived key may be indefinitely stored on the primary credential device 708 and the secondary credential device 704, respectively, and may be used to gain access to a protected resource as needed. Alternatively, the master key and the derived key may be stored on the primary credential device 708 and the secondary credential device 704, respectively, for a predetermined period of time (e.g. 10 minutes, 1 hour, 1 day, 1 week, etc.) or at least until a predetermined event or sequence of events occur. As an example, when the predetermined time period expires, the primary credential device 708 and the secondary credential device 704 may be configured to obtain a new master key and derived key, respectively, immediately, or to wait to obtain a new key until another access attempt is made (e.g. as evidenced from receipt of a communication from a reader 712) or until some other event occurs (e.g. identification of an access attempt by the primary credential device 708; receipt of an instruction from a primary credential device 708; or passage of a predetermined period of time from a previous event, such as earlier receipt of a master key or a derived key or receipt of a communication from a reader 712; or movement of the primary credential device 708 and/or the secondary credential device 704 into a predetermined geographical area; or connection of the primary credential device 708 and/or the secondary credential device 704 to a predetermined wireless network). As yet another alternative, one or both of the primary credential device 708 and the secondary credential device 704 may obtain and use a master key and a derived key, respectively, from the key locker 740 only in conjunction with a specific access attempt, such that a key is never maintained on the primary credential device 708 or the secondary credential device 704 for more than a brief time period.

Many variations of the foregoing embodiments are within the scope of the present disclosure. For example, a cloud-based key locker 740 may store one or more master keys in addition to one or more derived keys and/or key derivation functions for generating derived keys. Both the primary credential device 708 and the secondary credential device 704 may obtain derived keys from the key locker 740, and access to a protected resource may be granted as long as both derived keys are provided to the reader 412 within a given time period (e.g. simultaneously or near-simultaneously), and/or as long as both derived keys come from the same master key, and/or as long as both derived keys are identified on a list of authorized keys that is available to the reader 412. Alternatively, the primary credential device 708 may obtain the master key from the key locker 740, and the secondary credential device 704 may obtain a derived key from the key locker 740. The master and derived keys may be used for obtaining access to a protected resource and then returned, deleted, or otherwise discarded, or they may expire after a certain period of time, thus necessitating replacement, or they may last only long enough to make a single access attempt. In this manner, replacement of the primary credential device 708 (e.g. if the user 702 loses the primary credential device 708) is facilitated as is replacement of the secondary credential device 704 (e.g. if the user 702 loses the secondary credential device 704).

Figure 8:
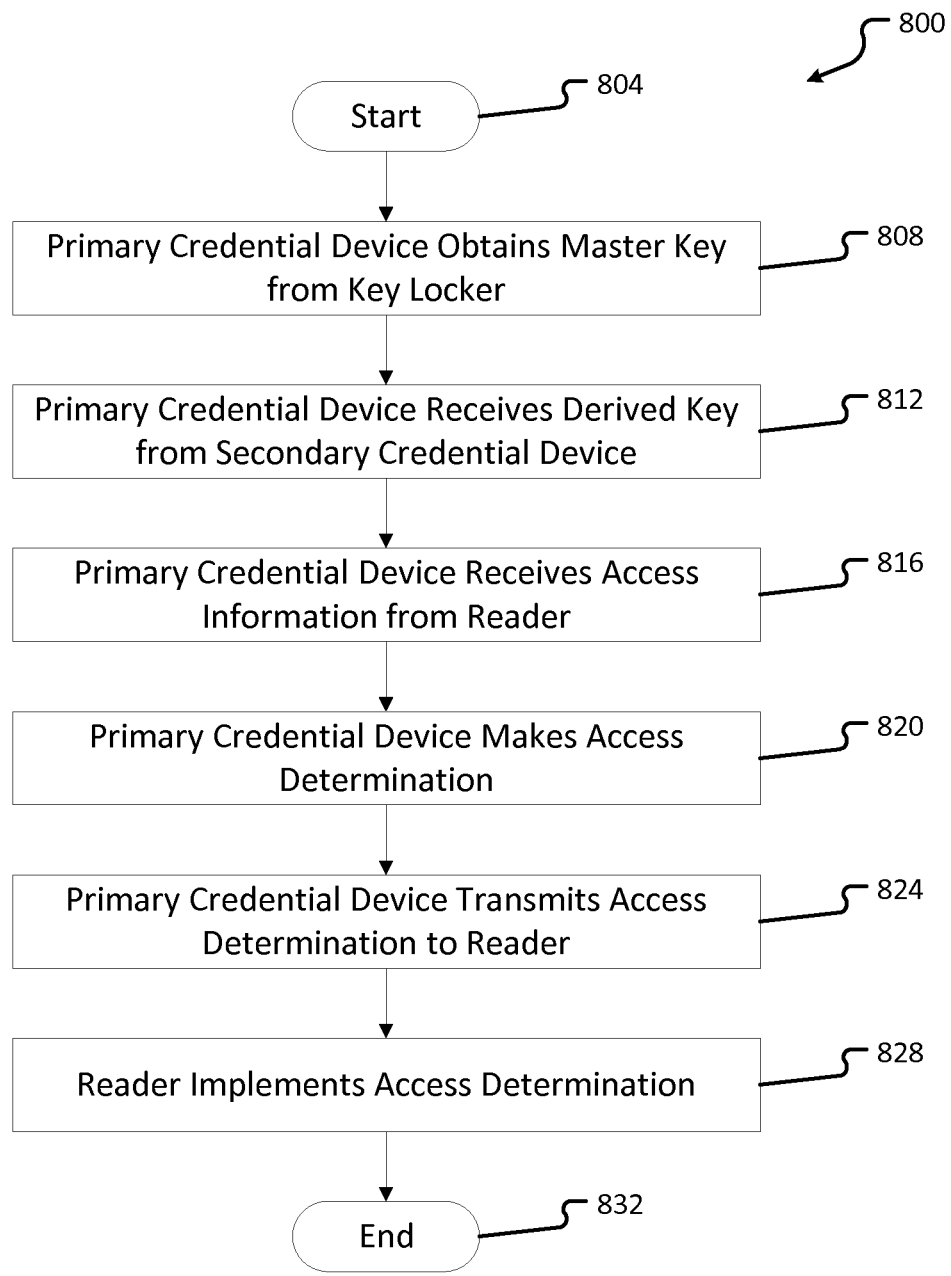
FIG. 8 is a flowchart depicting a method according to some embodiments of the present disclosure.

FIG. 8 is a flowchart of a method 800 according to embodiments of the present disclosure. In the method 800, the access control decision is made by the primary credential device 708 and, once made, communicated to the reader 712.

In the method 800, a primary credential device 708 obtains a master key from a key locker 740 (step 808). The primary credential device 708 may request a master key from the key locker in response to detecting a nearby reader 712, or at the command of the user 702, or based on some information gathered through the user interface 324, the device interface 328, the network interface 332, or any other component of the primary credential device 708 (including, in embodiments, one or more sensors, such as motion sensors, location sensors, and the like). In some embodiments, the primary credential device 708 establishes a secure communication channel, using known methods and techniques, with the key locker 740 via the communication network 736 before the master key is transmitted from the key locker 740 to the primary credential device 708. In embodiments, the primary credential device must provide a password or other credentials to the key locker 740 in order to obtain a master key therefrom.

The primary credential device 708 also receives a derived key from the secondary credential device 704 (step 812). In embodiments, the secondary credential device 704 obtains the derived key from the key locker 740 in the same way as or in a similar way to the way in which the primary credential device 708 obtains the master key from the key locker 740. In embodiments, the secondary credential device 704 may send the derived key to the primary credential device 708 upon receipt of a request from the primary credential device 708, or based upon an independent determination that the reader 712 is nearby (which may involve, for example, communication with the reader 412), or based upon a manual input by the user 702.

In step 816, the primary credential device 708 receives access information from the reader 712. The access information, which may not be utilized in some embodiments, may include one or more of device-specific hours of operation (e.g. hours during which a particular primary credential device 708 or a particular master key may gain access to a protected resource through the reader 712), a list of authorized devices (in which authorized devices are identified by serial number or other identification information), a hash of one or both of the keys (e.g. the master key and the derived key) that are needed for access to the device in question, and identification information for the reader 712. Here again, the primary credential device 708 may establish a secure communication channel with the reader 712 before the access information is transmitted from the reader 712 to the primary credential device 708.

Using the master key, the derived key, and the access information, the primary credential device 708 makes an access determination (step 820). This may involve, for example, one or more of verifying that the derived key is a derivative of the master key; by determining that the derived key and/or the master key is on a list of authorized keys received from the reader 712; by comparing a hash of the master key and the derived key with a hash received from the reader 712 to determine whether the proper master key and derived key were used; determining whether an identification number corresponding to the primary credential device 708 and the secondary credential device 704 is on a list of approved or authorized devices received from the reader 712; and determining whether the primary credential device 708 and/or the secondary credential device 704 is entitled to obtain access via the reader 712 at the time of the access attempt.

The primary credential device 708 sends its access determination to the reader 712 in step 824. Thus, for example, if the derived key is authorized, and if the master key is also authorized, then the primary credential device 708 sends an access granted message to the reader 712. If one or both of the master key and the derived key are not authorized, then the primary credential device 708 sends an access denied message to the reader 712. Based upon the access determination received from the primary credential device 708, the reader 712 grants or denies access (step 828).

Notably with respect to the method 800, the key locker 740 may not have any relationship to the reader 712 or to the access control system of which the reader 712 is a part, other than that it stores a master key and/or a derived key needed to obtain access via the reader 712. Thus, for example, the key locker 740 may be a personal key locker of the user 702, and may store the various keys needed by the user 702 to gain access to a variety of protected resources that the user 702 is authorized to access. Alternatively, the key locker 740 may be administered by a group, organization, or other entity to which the user 702 belongs, and may store master and/or derived keys needed by members of the group, organization, or other entity to gain access to the protected resources protected by the reader 712 and/or other access control readers or systems. The key locker 740 may be protected with one or more forms of encryption or other security, and/or may be accessible only to persons or devices having specific information known or provided only to members of the group, organization, or other entity (and/or or to the members' credential devices).

As with other embodiments, if the secondary credential device 704 is lost, it can be easily replaced with another secondary credential device that can obtain a replacement derived key from the key locker 740. Additionally, a primary credential device 708, if lost, can be replaced with another primary credential device 708 that can obtain a replacement master key from the key locker 740. If desired, the derived key on the original secondary credential device 704 may be de-listed from an authorized key list or blacklisted. However, even without taking these steps, the derived key on the original secondary credential device 704 may not be used to gain access separately from the primary credential device 708 and the master key, such that loss of the secondary credential device 704 does not result in a breach of security.

The exemplary systems and methods of this disclosure have been described in relation to wearable devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-Sυ processors, other industry-equivalent processors, and may perform computational functions using any known or future-developed standard, instruction set, libraries, and/or architecture.

What is claimed is:

1. A method, comprising:
receiving a signal at a primary credential device;
in response to receiving the signal, identifying an access attempt at the primary credential device;
in response to identifying the access attempt, generating a derived key, wherein the derived key is a derivative of a master key and wherein the master key is not determined from the derived key;
sending the master key to an access control reader via a first communication path; and
sending the derived key to the access control reader via a second communication path, wherein the first communication path flows through a secondary credential device which forwards the derived key to the access control reader thereby enabling the access control reader to make a physical access control decision with respect to the access attempt based, at least in part, on determining that the master key and the derived key indicate authorization to access a protected physical resource.

2. The method of claim 1, further comprising:
causing the secondary credential device to delete the derived key from memory after the secondary credential device forwards the derived key to the access control reader.

3. The method of claim 1,
wherein the signal is transmitted by the access control reader and wherein the primary credential device generates the derived key.

4. The method of claim 1, wherein identifying the access attempt at the primary credential device comprises:
receiving a sensor input that correlates with proximity to the access control reader.

5. The method of claim 1, wherein identifying the access attempt at the primary credential device comprises:
receiving a user input at the primary credential device indicating that a user desires the primary credential device to initiate a physical access process with the access control reader.

6. The method of claim 1, wherein identifying the access attempt at the primary credential device comprises:
- detecting that the primary credential device is within a predetermined proximity of the access control reader; and
- providing a prompt to a user of the primary credential device asking whether the user desires the primary credential device to establish communications with the access control reader.

7. The method of claim 1, further comprising:
- establishing a secure communication channel with the secondary credential device prior to sending the derived key to the secondary credential device, wherein the second communication path comprises the secure communication channel.

8. The method of claim 1, wherein the first communication path and the second communication path utilize a common communication protocol.

9. The method of claim 1, wherein the first communication path and the second communication path utilize different communication protocols.

10. An access control system, comprising:
- a processor;
- a communication interface in communication with the processor; and
- a memory storing instructions that, when executed by the processor, cause the processor to:
  - receive a signal at a primary credential device;
  - in response to receiving the signal, identify an access attempt at the primary credential device;
  - in response to identifying the access attempt, generate a derived key, wherein the derived key is a derivative of a master key, and wherein the master key is not determined from the derived key;
  - send the master key to an access control reader via a first communication path; and
  - send the derived key to the access control reader via a second communication path, wherein the first communication path flows through a secondary credential device which forwards the derived key to the access control reader thereby enabling the access control reader to make a physical access control decision with respect to the access attempt based, at least in part, on determining that the master key and the derived key indicate authorization to access a protected physical resource.

11. The access control system of claim 10, wherein the instructions further cause the processor to:
- cause the secondary credential device to delete the derived key from memory after the secondary credential device forwards the derived key to the access control reader.

12. The access control system of claim 10,
- wherein the signal is transmitted by the access control reader and wherein the primary credential device generates the derived key.

13. The access control system of claim 10, wherein identifying the access attempt at the primary credential device comprises:
- receiving a sensor input that correlates with proximity to the access control reader.

14. The access control system of claim 10, wherein identifying the access attempt at the primary credential device comprises:
- receiving a user input at the primary credential device indicating that a user desires the primary credential device to initiate a physical access process with the access control reader.

15. The access control system of claim 10, wherein identifying the access attempt at the primary credential device comprises:
- detecting that the primary credential device is within a predetermined proximity of the access control reader; and
- providing a prompt to a user of the primary credential device asking whether the user desires the primary credential device to establish communication with the access control reader.

16. The access control system of claim 10, wherein the instructions further cause the processor to:
- establish a secure communication channel with the secondary credential device prior to sending the derived key to the secondary credential device, wherein the second communication path comprises the secure communication channel.

17. The access control system of claim 10, wherein the first communication path and the second communication path utilize a common communication protocol.

18. The access control system of claim 10, wherein the first communication path and the second communication path utilize different communication protocols.

19. A primary credential device for an access control system, comprising:
- a processor;
- a communication interface; and
- a memory having a key vault for storing a master key, the memory further storing instructions for execution by the processor, the instructions, when executed by the processor, causing the processor to:
  - receive a signal;
  - in response to receiving the signal, identify an access attempt;
  - in response to identifying the access attempt, generate a derived key, wherein the derived key is a derivative of the master key, and wherein the master key is not determined from the derived key;
  - send the master key to an access control reader via a first communication path; and
  - send the derived key to the access control reader via a second communication path, wherein the first communication path flows through a secondary credential device which forwards the derived key to the access control reader thereby enabling the access control reader to make a physical access control decision with respect to the access attempt based, at least in part, on determining that the master key and the derived key indicate authorization to access a protected physical resource.

20. The primary credential device of claim 19, wherein the instructions further cause the processor to:
- cause the secondary credential device to delete the derived key from its memory after the secondary credential device forwards the derived key to the access control reader.

* * * * *